(12) United States Patent
Karger

(10) Patent No.: US 7,197,316 B2
(45) Date of Patent: Mar. 27, 2007

(54) METHOD FOR ADMINISTERING RADIO RESOURCES BY MONITORING THE INTERFERENCE SITUATION

(75) Inventor: Stephan Karger, Hamminkeln (DE)

(73) Assignee: Siemens Aktiengesellschaft, Munich (DE)

( * ) Notice: Subject to any disclaimer, the term of this patent is extended or adjusted under 35 U.S.C. 154(b) by 310 days.

(21) Appl. No.: 10/345,976

(22) Filed: Jan. 17, 2003

(65) Prior Publication Data

US 2003/0134639 A1     Jul. 17, 2003

(30) Foreign Application Priority Data

Jan. 17, 2002  (EP)  ................... 02001269

(51) Int. Cl.
  *H04Q 7/20*  (2006.01)
(52) U.S. Cl. ............... 455/452.1; 455/67.13; 455/513; 370/200
(58) Field of Classification Search ........ 455/452, 455/463, 466, 450, 509, 513, 67.11, 67.13, 455/423, 424; 375/147
  See application file for complete search history.

(56) References Cited

U.S. PATENT DOCUMENTS

| | | | | |
|---|---|---|---|---|
| 5,606,727 | A * | 2/1997 | Ueda ........................ | 455/513 |
| 5,761,623 | A * | 6/1998 | Lupien et al. ........... | 455/552.1 |
| 6,023,463 | A | 2/2000 | Wiedeman et al. | |
| 6,640,108 | B2 * | 10/2003 | Lu et al. .................. | 455/463 |
| 2003/0021334 | A1 * | 1/2003 | Levin et al. ............. | 375/147 |
| 2003/0054843 | A1 * | 3/2003 | Notani et al. ........... | 455/466 |
| 2003/0125038 | A1 * | 7/2003 | Western ................... | 455/452 |

FOREIGN PATENT DOCUMENTS

| | | |
|---|---|---|
| EP | 1122965 | 8/2001 |
| WO | 9845967 | 10/1998 |
| WO | 0057658 | 9/2000 |

* cited by examiner

*Primary Examiner*—Joseph Feild
*Assistant Examiner*—Phuoc Doan
(74) *Attorney, Agent, or Firm*—Bell, Boyd & Lloyd LLP

(57) ABSTRACT

In a method for administering radio resources in a mobile radio cell, which includes a plurality of mobile terminals which are distinguishable by their radio signals, and a base station, the administration of radio resources of a mobile radio cell is improved to such an extent that the available radio resources are utilized more economically. A mobile terminal is requested by the base station to send out a signal, currently present at a receiver of the mobile terminal, which is representative of an interference situation at the location of the mobile terminal. This is sent together with information for estimating the channel between the mobile terminal and the base station so that the base station receives raw data at the location of the mobile terminal, and evaluates the signal received from the mobile terminal and the information for estimating the channel between the mobile terminal and the base station for determining the radio sources forming the basis of the signal and the intensities of at least some of the radio sources. Further, the base station in the mobile radio cell adapts the distribution of the radio resources for improving the interference situation at the location of the mobile terminal.

20 Claims, No Drawings

METHOD FOR ADMINISTERING RADIO RESOURCES BY MONITORING THE INTERFERENCE SITUATION

The present application hereby claims priority under 35 U.S.C. §119 on European patent application number 02001269.6 filed Jan. 17, 2002, the entire contents of which are hereby incorporated herein by reference.

FIELD OF THE INVENTION

The invention generally relates to a method for administering radio resources in a mobile radio cell, preferably in one which comprises a plurality of mobile terminals which can be distinguished by their radio signals, and a base station.

BACKGROUND OF THE INVENTION

Such mobile terminals can be distinguished, for example, by the fact that they transmit in different time slots in a TDMA system or at different frequencies in an FDMA system or can be identified by different codes in a CDMA system. Combinations of the discrimination systems enumerated above are also possible. In all of these systems, it is necessary to ensure for each individual mobile terminal that it operates with a suitable signal/interference ratio (SIR).

The required SIR ratio has previously been ensured by measuring this ratio by use of the mobile terminal with the aid of the signal associated with it, according to which a higher signal power is requested from the base station if necessary.

SUMMARY OF THE INVENTION

On the basis of this, it is an object of an embodiment of the invention to improve the administration of radio resources of a mobile radio cell in such a manner that the available radio resources are utilized more economically.

This object may be achieved by a method for administering radio resources in a mobile radio cell which comprises a plurality of mobile terminals which can be distinguished by their radio signals, and a base station, in which method: a mobile terminal is requested by the base station to send out a signal, currently present at a receiver of the mobile terminal, which is representative of an interference situation at the location of the mobile terminal, together with information for estimating the channel between the mobile terminal and the base station so that the base station receives raw data at the location of the mobile terminal, evaluates the signal received from the mobile terminal and the information for estimating the channel between the mobile terminal and the base station for determining the radio sources forming the basis of the signal and the intensities of at least some of the radio sources, and the base station in the mobile radio cell adapts the distribution of the radio resources for improving the interference situation at the location of the mobile terminal.

This makes it possible, for example, for the base station to be informed very accurately about the interference situation at the mobile terminal by evaluating the signal which has been received and sent on by the mobile terminal. The evaluation of the interference situation can lead to a particular further mobile terminal being identified as the main interference source for the mobile terminal, for example by means of its CDMA code and its intensity. In the case of a CDMA system, the base station knows all the codes used in the mobile radio cell and their allocation to the mobile terminals in the mobile radio cell, whereas the mobile terminal only knows its own the codes and the general codes. After a main interference source has been identified, the radio resource used by the main interference source can be altered in such a manner that the interference situation is improved at the location of the mobile terminal which has sent on the signal.

Possible radio sources which have an interfering effect are primarily mobile terminals from the same mobile radio cell. However, it is also possible that base stations from adjacent mobile radio cells act as interference sources. Both types of interference sources can be identified at the base station to which the mobile terminal in question is allocated, and the intensity of a respective interference signal is also measured. The at least some radio sources for which intensities are measured will frequently be those in which the intensities are particularly high.

The number of signal values to be evaluated depends on the requirements which are sufficient for enabling the base station to appropriately identify individual interference sources. The probability with which interference sources are to be identified can be predetermined and will depend on empirical results for the interference situation in the mobile radio cell.

As soon as the resource used by the main interference source is suitably altered, the interference situation will be improved at the location of the mobile terminal. In this manner, an increase in the transmitting power of the base station, which is required according to the prior art, can be reduced or not carried out.

The information for estimating the channel between mobile terminal of the base station can be pilot bit or midamble bit sequences used in the conventional manner, which can be evaluated by the base station in order to determine the characteristics of the channel for the return transmission from the mobile terminal to the base station.

In the case where the mobile terminal wishes to establish a signaling link with a second mobile terminal, the base station can preferably initialize a direct link between the mobile terminal and the second mobile terminal if, as a result, the interference situation is improved at the location of the mobile terminal. According to the prior art, the signaling link between the mobile terminal and the second mobile terminal is implemented via the base station. If, however, the mobile terminal and the second mobile terminal are located, for example, at a short distance from one another, the second mobile terminal can be a main interference source for the mobile terminal if the signaling link extends via the base station, whereas a direct link would lead to saving resources and would also allow a suitable signal/noise ratio to be expected.

A direct link between the mobile terminal and the second mobile terminal can be established, in particular, if the strongest radio source identified in the received signal of the mobile terminal is the second mobile terminal, taking into account the interference situation in the radio cell overall. In this context, attention must be paid to the fact that the direct link does not lead to excessive interference in other mobile terminals since in this case, one of the mobile terminals must send within a downlink resource and the so-called "near-far problem" may occur.

Since the mobile terminals in the mobile radio cell are not stationary, the interference situation in the mobile radio cell is a function of time. For this reason, the interference situation also changes for each individual mobile terminal in the mobile radio cell. To avoid the mobile terminal—which handles the function of the base station in a direct link—from causing inadmissible interference at other mobile terminals, all mobile terminals in the radio cell can repetitively send out received samples to the base station and, on the basis of this the base station can check the distribution of the radio resources in the mobile radio cell.

DETAILED DESCRIPTION OF THE
PREFERRED EMBODIMENTS

In the text which follows, an exemplary embodiment of the method will be described: it is the aim of the method to check the interference situation for a particular mobile terminal in a mobile radio cell. Firstly, a base station, in the mobile radio cell of which the mobile terminal is located, requests the mobile terminal by way of a signal to send a currently received signal, which is representative of an interference situation at the location of the mobile terminal, to the base station. This signal can be picked up immediately behind an analog/digital converter of the receiving end of the mobile terminal, so that raw data for the location of the mobile terminal are conveyed to the base station. Together with the received signal, an information sequence is also conveyed to the base station from the mobile terminal, which allows the base station to perform a channel estimation for the transmission from the mobile terminal to the base station. So-called pilot sequences or midamble sequences are already known in the prior art for this purpose.

All mobile terminals in the mobile radio cell operate in accordance with the CDMA method, so that at least one CDMA code is allocated to each mobile terminal. All these CDMA codes are known to the base station and are administered by it.

The signal received by the base station is processed further by the base station to the extent that it determines by way of the signal what interference sources in the form of, for example, other mobile terminals in the mobile radio cell are reflected in the signal. This is carried out by means of the known CDMA codes.

The base station determines what other mobile terminals make which contribution to the interference at the location of the mobile terminal, the interference situation of which is to be determined. On the basis of this result, the base station, if necessary, assigns other physical resources to other mobile terminals which are estimated to be particularly strong interference sources for the mobile terminal, so that the interference situation is improved at the location of the mobile terminal. Thus, in contrast to the prior art, the transmitting power for the communication link between the mobile terminal and the base station is not increased, rather the originators of interference powers are determined so that the interference power is reduced for the mobile terminal, for example by assigning a different carrier or time slot for an interference source.

The evaluation of the signal which the base station has received from the mobile terminal can also be used for establishing, if required, a direct link between the mobile terminal and a second mobile terminal which want to establish a communication link. If, for example, the second mobile terminal is identified as a main interference source in the signal which forms the raw data at the location of the mobile terminal and is conveyed from the mobile terminal to the base station for evaluation, a direct link between the mobile terminal and the second mobile terminal can be initialized by the base station. As a boundary condition, attention must be paid to the fact that the interference situation is not inadmissibly impaired in the mobile radio cell.

To monitor the interference situation in the mobile radio cell overall, currently received signals can be transmitted in each case at regular intervals by each individual mobile terminal to the base station which then influences the distribution of the physical resources used in the mobile radio cell if necessary. This also takes into account the fact that the interference situation in a mobile radio cell is subject to variation with time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for administering radio resources in a mobile radio cell which includes a plurality of mobile terminals which can be distinguished by their radio signals, and a base station, the method comprising:

requesting a mobile terminal to send out a signal currently present at a receiver of a mobile terminal, the signal being representative of an interference situation at the location of the mobile terminal, together with information for estimating the channel between the mobile terminal and the base station so that the base station receives raw data at the location of the mobile terminal;

evaluating the signal received from the mobile terminal and the information for estimating the channel between the mobile terminal and the base station for determining the radio sources forming the basis of the signal and the intensities of at least some of the radio sources; and adapting, in the base station in the mobile radio cell, the distribution of the radio resources for improving the interference situation at the location of the mobile terminal.

2. The method as claimed in claim 1, wherein, in the case where the mobile terminal wishes to establish a communication link with a second mobile terminal, the base station initializes a direct link between the mobile terminal and the second mobile terminal if, as a result, the interference situation is improved at the location of the mobile terminal.

3. The method as claimed in claim 2, wherein a direct link between the mobile terminal and the second mobile terminal is established if the strongest radio source identified in the sequence of samples is the second mobile terminal, taking into account the interference situation in the radio cell overall.

4. The method as claimed in claim 1, wherein all mobile terminals in the mobile radio cell repetitively send out received raw data signals to the base station and wherein, on the basis of these signals, the base station checks the distribution of the radio resources in the mobile radio cell.

5. The method as claimed in claim 2, wherein all mobile terminals in the mobile radio cell repetitively send out received raw data signals to the base station and wherein, on the basis of these signals, the base station checks the distribution of the radio resources in the mobile radio cell.

6. The method as claimed in claim 3, wherein all mobile terminals in the mobile radio cell repetitively send out received raw data signals to the base station and wherein, on the basis of these signals, the base station checks the distribution of the radio resources in the mobile radio cell.

7. A method for administering radio resources in a mobile radio cell which includes a plurality of mobile terminals which can be distinguished by their radio signals, and a base station, the method comprising:

receiving a request from the base station to send out a signal currently present at a receiver of a mobile terminal, the signal being representative of an interference situation at the location of the mobile terminal, together with information for estimating the channel between the mobile terminal and the base station so that the base station receives raw data at the location of the mobile terminal, wherein the signal received from the mobile terminal and the information for estimating the channel between the mobile terminal and the base station for determining the radio sources form the basis of the signal and the intensities of at least some of the radio sources and wherein, in the base station in the mobile radio cell, the distribution of the radio resources are adapted to improve the interference situation at the location of the mobile terminal.

8. The method as claimed in claim 7, wherein, in the case where the mobile terminal wishes to establish a communication link with a second mobile terminal, a direct link between the mobile terminal and the second mobile terminal is initialized by the base station it as a result, the interference situation is improved at the location of the mobile terminal.

9. The method as claimed in claim 8, wherein a direct link between the mobile terminal and the second mobile terminal is established if the strongest radio source identified in the sequence of samples is the second mobile terminal, taking into account the interference situation in the radio cell overall.

10. The method as claimed in claim 7, wherein all mobile terminals in the mobile radio cell repetitively send out received raw data signals to the base station and wherein, on the basis of these signals, the distribution of the radio resources in the mobile radio cell is checked by the base station.

11. The method as claimed in claim 8, wherein all mobile terminals in the mobile radio cell repetitively send out received raw data signals to the base station and wherein, on the basis of these signals, the distribution of the radio resources in the mobile radio cell is checked by the base station.

12. The method as claimed in claim 9, wherein all mobile terminals in the mobile radio cell repetitively send out received raw data signals to the base station and wherein, on the basis of these signals, the distribution of the radio resources in the mobile radio cell is checked by the base station.

13. A system for administering radio resources in a mobile radio cell which includes a plurality of mobile terminals which can be distinguished by their radio signals, and a base station, the system comprising:

means for requesting a mobile terminal to send out a signal currently present at a receiver of the mobile terminal, the signal being representative of an interference situation at the location of the mobile terminal, together with information for estimating the channel between the mobile terminal and the base station so that the base station receives raw data at the location of the mobile terminal;

means for evaluating the signal received from the mobile terminal and the information for estimating the channel between the mobile terminal and the base station for determining the radio sources forming the basis of the signal and the intensities of at least some of the radio sources; and means for adapting, in the base station in the mobile radio cell, the distribution of the radio resources for improving the interference situation at the location of the mobile terminal.

14. The system as claimed in claim 13, further comprising:

means for initializing a direct link between the mobile terminal and a second mobile terminal by the base station, if, as a result, the interference situation is improved at the location of the mobile terminal in the case where the mobile terminal wishes to establish a communication link with the second mobile terminal.

15. The system as claimed in claim 14, further comprising:

means for establishing the direct link between the mobile terminal and the second mobile terminal if the strongest radio source identified in the sequence of samples is the second mobile terminal, taking into account the interference situation in the radio cell overall.

16. The system as claimed in claim 15, further comprising:

means for repetitively sending out received raw data signals to the base station from all mobile terminals in the mobile radio cell; and means for checking the distribution of the radio resources in the mobile radio cell by the base station on the basis of these signals.

17. The system as claimed in claim 14, further comprising:

means for repetitively sending out received raw data signals to the base station from all mobile terminals in the mobile radio cell; and means for checking the distribution of the radio resources in the mobile radio cell by the base station on the basis of these signals.

18. The system as claimed in claim 13, further comprising:

means for repetitively sending out received raw data signals to the base station from all mobile terminals in the mobile radio cell; and means for checking the distribution of the radio resources in the mobile radio cell by the base station on the basis of these signals.

19. A method for determining allocatable radio resources for a mobile radio cell which includes a plurality of mobile terminals distinguishable by their radio signals and a base station, the method comprising:

requesting a mobile terminal to send out a signal, the signal being representative of an interference situation at the location of the mobile terminal; and evaluating the signal received from the mobile terminal to determine the radio sources forming the basis of the signal and the intensities of at least some of the radio sources.

20. The method as claimed in claim 19, further comprising:

adapting, in the base station in the mobile radio cell, a distribution of the radio resources to improve the interference situation at the location of the mobile terminal.

* * * * *